(No Model.)
J. G. DOUGHTY.
CURRYING IMPLEMENT.
No. 600,194. Patented Mar. 8, 1898.
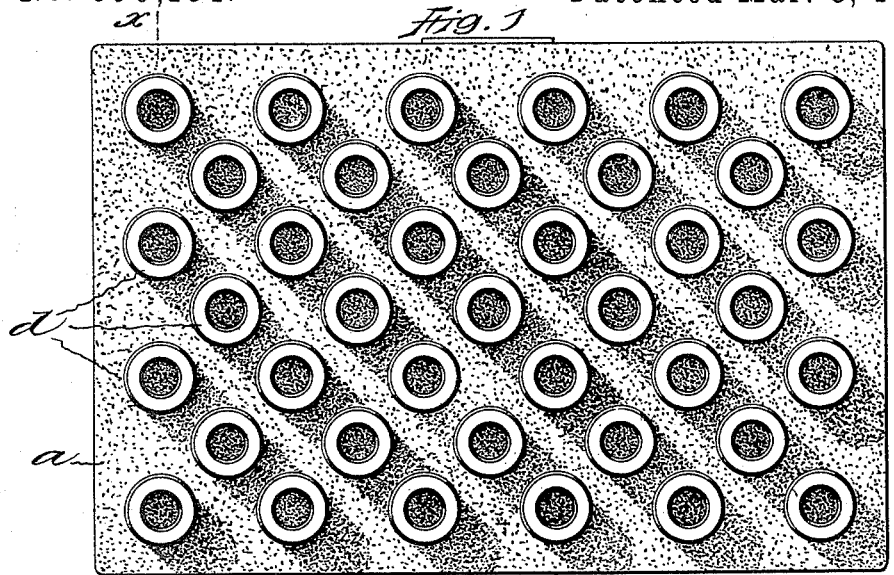
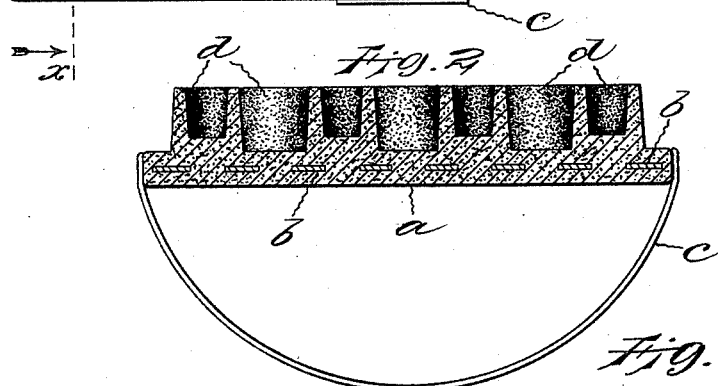
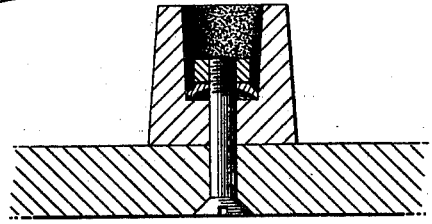
Witnesses
Andrew Ferguson,
C. E. Buckland,
Inventor
John G. Doughty
By W. E. Simonds
Attorney

UNITED STATES PATENT OFFICE.

JOHN G. DOUGHTY, OF WINSTED, CONNECTICUT.

CURRYING IMPLEMENT.

SPECIFICATION forming part of Letters Patent No. 600,194, dated March 8, 1898.

Application filed December 26, 1896. Serial No. 617,034. (No model.)

*To all whom it may concern:*

Be it known that I, JOHN G. DOUGHTY, a citizen of the United States of America, and a resident of Winsted, in the county of Litchfield and State of Connecticut, have invented a certain new and useful Improvement in Currying Implements, of which the following is a description, reference being had to the accompanying drawings, wherein—

Figure 1 is a face view of an implement embodying said improvement. Fig. 2 is a view of the same implement in vertical cross-section on the plane $xx$. Fig. 3 is a detailed sectional view showing a mode of attaching an open-centered rubber finger to a suitable back or base.

The object of the improvement is the production of an implement or device for currying or rubbing down a horse or other animal.

In the accompanying drawings, the letter $a$ denotes a back or base of rubber. There is embedded therein a perforated elastic metallic plate $b$. A suitable handle or strap $c$ is attached to the rear side of this base.

The letter $d$ denotes open-centered rubber fingers attached on the front of the base $a$ by being made integral therewith.

The practical action of the device in use is greatly superior to that of the common curry-comb.

In Fig. 3 there is shown an open-centered rubber finger made separate from the back of the implement and attached thereto by a short bolt and nut. The head of the bolt is flush with the rear face of the back, and the nut bears upon a concave washer interposed between the nut and the bottom of the open center of the finger.

I claim as my improvement—

1. A currying implement consisting of a flexible rubber back or base, open-centered flexible rubber fingers with walls of definite thickness throughout secured thereto, and a suitable strap-handle, substantially as shown and described.

2. The improved currying implement herein described, consisting of the flexible rubber back or base having a perforated elastic metallic plate embedded therein, integral open-centered rubber fingers with walls of definite thickness throughout, and a strap-handle, substantially as shown and described.

JOHN G. DOUGHTY.

Witnesses:
SOPHIA A. DOUGHTY,
ALICE P. SANFORD.